Figure 9:
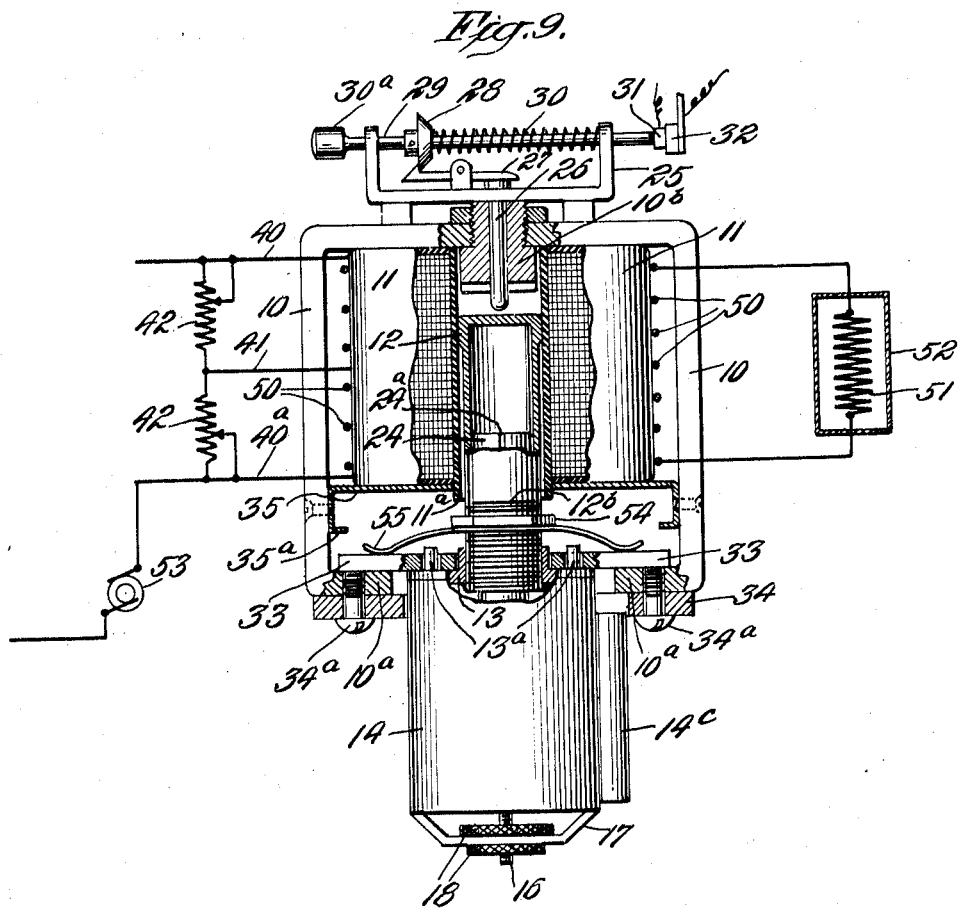

Jan. 19, 1943.　　H. K. KOUYOUMJIAN　　2,308,660
TIME DELAY RELAY
Filed March 12, 1940　　3 Sheets-Sheet 1
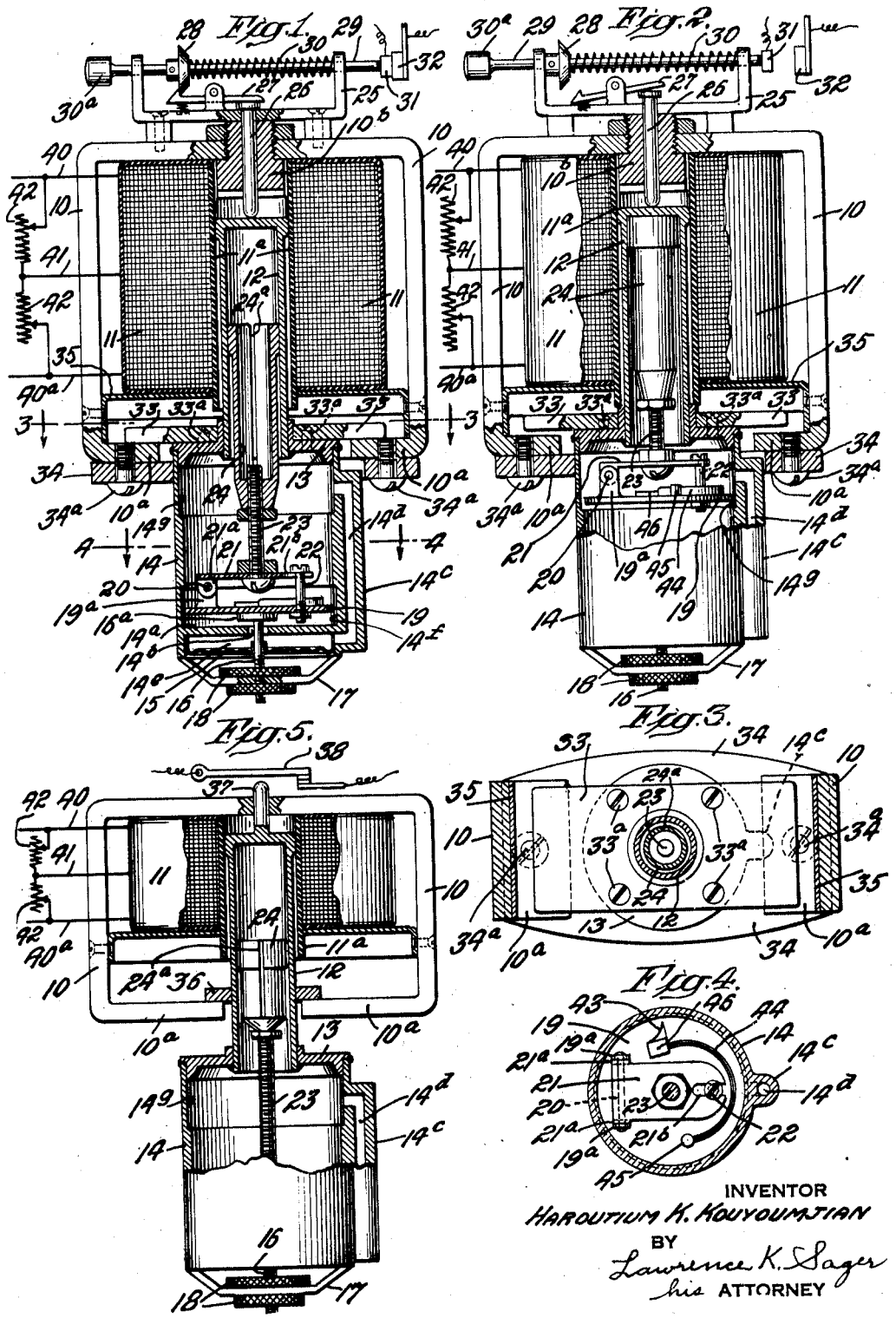
INVENTOR
HAROUTIUM K. KOUYOUMJIAN
BY
Lawrence K. Sager
his ATTORNEY

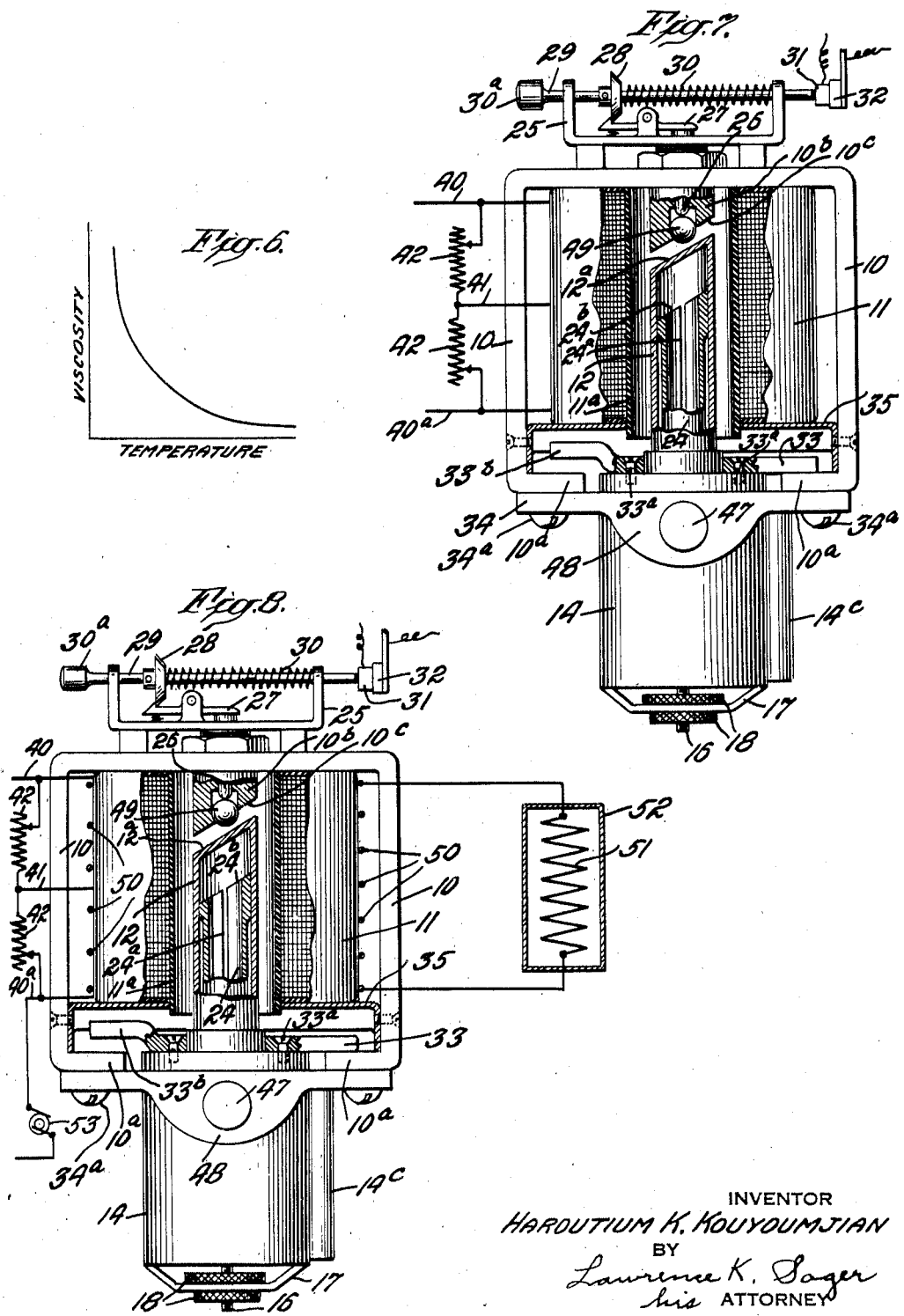

Jan. 19, 1943.　　　H. K. KOUYOUMJIAN　　　2,308,660
TIME DELAY RELAY
Filed March 12, 1940　　　3 Sheets-Sheet 3

INVENTOR
HAROUTIUM K. KOUYOUMJIAN
BY
Lawrence K. Sager
his ATTORNEY

Patented Jan. 19, 1943

2,308,660

UNITED STATES PATENT OFFICE 2,308,660

TIME DELAY RELAY

Haroutium K. Kouyoumjian, Wakefield, R. I., assignor to Ward Leonard Electric Company, a corporation of New York Application March 12, 1940, Serial No. 323,584

5 Claims. (Cl. 175—341)

This invention relates to relays applicable to various uses and of the type which imposes a time interval of varying amounts in its action, depending upon the strength and duration of the controlling force. It may be used for any desired purpose such as opening or closing a control circuit or for actuating any element after a proper time interval. It is of the electromagnetic and dashpot type.

The main object is to provide a relay of a high degree of accuracy which may be depended upon in long continued use to respond in close conformity to the same performance curve as determined by the strength and duration of the controlling force. Another object in one respect is to provide an improved character of magnetic circuit which undergoes a change of the path of the magnetic flux during operation with the purpose of avoiding instantaneous response of the relay even under extremely high values of the controlling force. This is for the purpose of always providing at least some time interval in its action so that other devices of the control system may have time to function before the relay attains its final position.

A further object is to improve the accuracy of the dashpot action by avoiding the use of check valves in the dashpot. Such valves are commonly used for permitting a quick return of the piston to its initial position but their failure to seat properly and uniformly at all times affects the controlling action to give varying and unpredictable results. The present invention permits a rapid return of the piston while avoiding variations in the response curve that are due to the use of check valves.

A further object is to provide a hermetically sealed movable portion including the dashpot so as to avoid evaporation or loss of liquid in the dashpot and to keep the parts free from any foreign matter. This, of course, aids in securing uniform action and dependability. A further object is to provide means for adjustment of parts within the dashpot by external means without affecting the sealing of the enclosing casing. A further object is to provide compensating means for change of viscosity of the liquid in the dashpot with change of temperature. A further object is to provide compensating means for change of temperature of the motor or other apparatus controlled, so that the relay will respond in a shorter time interval when the apparatus controlled is at a higher temperature than at other times and will respond according to such temperature. A further object is to adapt the relay to withstand shocks and jars without affecting its responsive action. Other objects and advantages will be understood from the following description and accompanying drawings.

The improvements in the dashpot disclosed herein are claimed in a divisional application Serial No. 367,419, filed November 27, 1940.

Fig. 1 is a vertical central section showing the parts in their initial lower position; Fig. 2 is a similar view showing the parts in their uppermost position, the element controlled by the relay having then been actuated; Fig. 3 is a horizontal section on the line 3—3 of Fig. 1; Fig. 4 is a horizontal section on the line 4—4 of Fig. 1; Fig. 5 is a vertical central section of a modification; Fig. 6 is a chart indicating change of viscosity of a liquid with change of temperature; Fig. 7 is a front view partly in section of a modified form of relay; Fig. 8 is a view similar to Fig. 7 with the addition of temperature compensating means; and Fig. 9 is a front view partly in section of another modification.

Referring to Figs. 1, 2 and 3, an inverted U-shaped frame 10, having inwardly projecting lower ends 10a, is of magnetic material, such as iron or steel. It has a central core 10b of magnetic material at its top portion which projects downwardly to some extent within the frame. A winding 11 having a central insulating sleeve 11a is positioned between the sides of the frame 10 and surrounds the core 10b at the upper part of the winding. A sheet metal strip 35 of non-magnetic material is secured at its ends to the lower portions of the sides of the frame 10 and serves to retain the winding 11 in position.

A cylinder 12, closed at its upper end and of non-magnetic material, is movable freely within the winding 11 and its upper end is normally below the lower end of the core 10b. The lower end of this cylinder is open and is secured by a sealed joint to the upper plate 13 of the dashpot. The cylindrical body 14 of the dashpot is joined to its upper plate 13 by a sealed joint, the lower end 14a of the dashpot having a small central opening 14b. The dashpot is provided with a vertically extending projecting portion 14c at one side having a passage 14d which connects the interior top portion of the dashpot with the space 14e below the bottom plate 14a. This space is closed by a flexible metal sheet 15 below the plate 14a, the sheet 15 being united at its outer rim by a sealed joint with an extended lower portion of the dashpot cylinder. A stem 16 carrying a head 16a above the plate 14a passes through the opening 14b with considerable clearance space and passes through the metal sheet 15, being secured thereto by a sealed joint. The lower end of the stem is threaded and passes freely through a cross-piece 17, the outer ends of which are fixed to the lower end of the dashpot. Above and below the cross-piece are nuts 18 threaded on the stem 16. It is evident that by adjusting these nuts the stem may be adjusted vertically to any desired position and the flexible sheet 15 will yield sufficiently to permit such adjustment without affecting any joint or interfering with the sealing of the unit. In forming the sealed joints above referred to, they may be soldered, brazed or otherwise formed to insure a perfectly sealed unit. Threaded connections or joints depending upon friction are not dependable for a permanent sealing and in the above described unit, all such connections are eliminated, even for the purpose of adjustment. Thus there can be no change in the unit due to the presence of any unsealed joint.

The piston 19 of the unit, instead of being of the usual form, is a flat circular plate of comparatively small thickness. This has at one side an upwardly extending pair of spaced projections 19a which are pivotally connected by a pin 20 to a pair of spaced projections 21a extending downwardly at one side of a plate or strip 21. This plate extends partially across the interior of the dashpot. Fixed to the piston plate 19 at the side opposite the hinged portion is an upwardly projecting screw bolt 22 which passes freely through a slot 21b in the cross-plate 21. The head of the bolt normally rests on the top of the plate 21 and then holds the hinged piston plate in a plane perpendicular to the axis of the dashpot cylinder. The lower end of the bolt and its nut are soldered to the plate 19 to avoid any change of adjustment. A screw bolt 23 is fixed to the center of the plate 21 and extends upwardly into the lower end of a cylinder 24 of magnetic material. The connections of the bolt to plate 21 and to the cylinder 24 are soldered to prevent change of adjustment after the desired condition is attained. The cylinder 24 is movable freely vertically within the cylinder 12 and in its lowest normal position the top of cylinder 24 is some distance below the top of the cylinder 12, as shown in Fig. 1. The cylinder 24 is provided with a vertical slot 24a at one side to reduce the effect of induced eddy currents when an alternating controlling current is applied to the winding 11.

The relay may be applied to the actuation of any desired controlled element and is here shown as serving to open a controlling circuit but could obviously be applied to the closing of a circuit or to perform any other desired function. A U-shaped frame 25 is shown fixed to the top of the frame 10. Passing down freely through the frame 25 and the center of the core 10b is a pin 26 which projects beyond the core and approaches close to, or may engage, the top of the cylinder 12, as shown in Fig. 1. The top of the pin is headed so as to be retained by the frame 25 when the pin is in its lowest position. Pivotally mounted on the frame 25 is a latch 27, the inner end of which engages the top of the pin 26 while its outer end is spring pressed upwardly to normally engage and restrain a circular beveled plate 28. This plate is fixed to a shaft 29 which is supported by and longitudinally movable in the upwardly extending ends of the frame 25. A spring 30 encircles the shaft between the plate 28 and one end of the frame and tends to move the shaft to the left against the latch 27. The left-hand end of the shaft is provided with a handle or knob 30a. The right-hand end carries an insulated contact 31 which is connected to any desired control circuit. This contact normally engages a fixed contact 32 through which the circuit is completed.

Returning now to the magnetic circuit of the relay, a cross-plate 33 of magnetic material is fixed to the top plate 13 of the dashpot by the screws 33a and normally engages the top of the inwardly projecting ends 10a of the magnet frame, as shown in Fig. 1. This completes a magnetic circuit from the sides of the frame 10 in a main path through the cross-plate 33 and cylinder 24 to the core 10b and then to the sides of the frame 10. This magnetic circuit tends to hold the movable unit comprising the dashpot, plate 33 and cylinder 12 in its lowest position with the plate 33 attracted downwardly towards the ends 10a of the magnet frame. In order to keep the movable unit from turning on its axis and to maintain the plate 33 in alinement with the extensions 10a under all conditions of operation, a brass plate 34 is fitted slidably over the dashpot and has a recess for receiving the side projection 14c of the dashpot, as shown in dotted lines in Fig. 3. This plate is fixed by screws 34a to the under side of the extensions 10a of the magnet.

The operation may be understood by first considering the parts in the positions shown in Fig. 1. When current is applied to the winding 11, a magnetic flux will be created which will pass mainly through the circuit, as already described, to the cross-plate 33, and the movable unit will be retained in the position shown in Fig. 1. If the current is sufficiently small, no action of the parts takes place. If, however, the current be increased to or above a predetermined amount, the magnetic cylinder 24 starts to move upwardly at a rate of movement depending upon the strength of the current in the winding 11. This action is due to the magnetic attraction imposed upon the cylinder 24 by the winding tending to draw it within the winding. The dashpot retards the upward movement of the cylinder 24, the rate of movement being dependent upon the relation between the magnetic force exerted upon the cylinder 24 and the retarding action of the dashpot. The magnetic force exerted depends, of course, upon the strength of current in the winding 11.

The dashpot is filled or nearly filled with a suitable liquid, such as oil, and is preferably of a character whose viscosity does not change materially with change of temperature. When the plate of the dashpot moves upwardly, the retarding force is dependent upon the rate of flow of the liquid through the passage 14b from the upper side of the plate 19 to its lower side. The rate of this flow is adjusted, in the manner already described, by the position of the stem 16 and its head 16a. Raising or lowering the position of the head 16a with reference to the bottom plate 14a of the dashpot will, of course, increase or decrease the space between the plate 14a and the underside of the head 16a and thereby control the rate of flow of the liquid in the dashpot. The lower portion of the dashpot cylinder is shown as having a slightly larger interior diameter 14f than the central portion and likewise the upper portion of the dashpot cylinder is shown as having a slightly larger diameter at 14g. The piston or plate 19 of the dashpot is fitted quite closely to pass along the central portion of the dashpot without much clearance so as to reduce the passage of oil around the rim of the plate 19 to a comparatively small amount. The enlarged lower portion 14f of the dashpot cylinder is for the purpose of permitting the dashpot plate 19 to be moved easily and quickly from its lowest position to the portion of the cylinder having a smaller diameter. This reduces friction of repose of the parts and likewise avoids any tendency of the parts to stick in their lowest position and requires a comparatively light force of short duration to raise the plate 19 to engage the central portion of the dashpot which has the smaller diameter. The plate 19 and cylinder 24 then move upwardly at a rate dependent upon the factors already described.

The magnetic attraction of the cylinder 24 is affected by two branch magnetic circuits. One, as already described, is through the plate 33. The other is from the sides of the frame 10 below the winding to the cylinder 24 and then to the core 10b. In the initial position of the parts, the flux passing through the plate 33 is so strong that the movable unit is held down. But as the cylinder 24 passes upwardly, it finally reaches a position where the flux through the plate 33 is greatly decreased whereas the flux from below the winding to the cylinder 24 is greatly increased. This relative change of flux in the two paths finally results in the weight of the parts and attractive force between the plate 33 and the extensions 10a being overcome by the upward pull exerted on the cylinder 24. The movable unit, comprising the plate 33, cylinder 12 and dashpot with their contents, then moves bodily and quickly to its raised position as shown in Fig. 2. This action raises the pin 26, trips the latch and permits the spring 30 to open the controlling circuit at the contacts 31 and 32. At the time this action takes place, the plate 19 of the dashpot passes into the region of the larger diameter 14g which suddenly reduces the retarding dashpot action and thereby cooperates in permitting a quick movement of the unit in its final responsive action.

Upon discontinuance of the current in the winding 11, or its reduction to a sufficient amount, the weight of the parts will restore them to their initial position shown in Fig. 1. The controlling switch may be reclosed by the handle 30a and the device is then in a condition to repeat its action.

The cylinder or movable core 24 when released is permitted to fall rapidly within the cylinder 12. This is due to the fact that when the plunger starts to move down, the liquid in the dashpot will turn the plate 19 about its pivot pin 20 and cause its opposite portion to move up against the plate 21. This permits the free flow of the liquid around the edges of the plate 19, in its tilted position, and thereby permits the plate 19 and parts connected therewith to fall to their lowest position shown in Fig. 1. It is evident that when the attractive force again raises the cylinder 24, the plate 19 will always have the same definite position in relation to the other parts and always give uniformity of action in its upward movement. It is thus apparent that the variables introduced by the use of check valves are avoided and that the device permits a quick return of the parts to their initial positions.

It is evident that the relay cannot function to give immediate response to an excessively high current in the winding 11 because the core or cylinder 24 must always travel upwardly a certain distance within the cylinder 12 before there is sufficient change of flux in the respective magnetic paths to permit the upward movement of the movable unit. Moreover, the relay is dependable for securing the same response curve with reference to time intervals and the strength and duration of current in the winding 11 because there are no variables which affect the operation, even after long continued use.

The parts may be variously designed and modified for adaptability to particular requirements and in accordance with the preferences of the designer. In some cases the strip 35 may be made of magnetic material and reduced in size or extent provided the magnetic circuit is designed to insure a proper flux at the bottom of the winding 11 to overcome, at the proper time, the magnetic attraction of the magnetic circuit which initially retains the movable unit in its lower position. The core 10b may sometimes be eliminated or may be extended further within the winding 11 for adaptation to the proportions of other parts.

In Fig. 5 a modification is shown of somewhat simplified construction. Parts corresponding to those already described are designated by the same reference characters as previously used. In Fig. 5 a circular projecting hub or flange 36 is fixed on the outside of the cylinder 12 and is of magnetic material normally resting upon the upper faces of the extensions 10a of the magnet frame. The upper end of the cylinder 12 carries a projecting pin 37 which freely passes through the frame 10, and when the movable unit is raised it will open the circuit controlled by the switch 38. The action is similar to that already described. Various other changes and modifications may be made without departing from the scope of the invention.

The manner of changing the response curve of the relays already described may now be considered. This curve is one wherein the load is represented by ordinates and the time of response of the relay is represented by abscissae. The curve slopes downwardly from the left to the right. The effect of adjusting the stem 16 in the manner already described for controlling the rate of flow of the liquid in the dashpot, is to change the response curve in a horizontal direction. In the above described relays means are provided for changing the response curve in a vertical direction. This is accomplished by providing an adjustable shunt path to the winding 11. Additional control is obtained by providing one or more taps on the winding 11 and adjusting a shunt path between the connections to the windings. Figs. 1, 2 and 5 show the connections 40, 40a extending from the terminals of the winding 11 and an intermediate tap connection 41. Between the connection 41 and the two leads 40, 40a are adjustable shunting resistances 42. By correspondingly adjusting the resistances 42, a portion of the load current is more or less shunted and correspondingly changes the response curve in a vertical direction. By adjusting the resistances 42 between the tap and the outside connections relatively to each other the shape of the response curve may be varied. Thus by these various means of adjustment, the response may be changed to suit any particular requirements.

Where the temperature changes of the dashpot are such as to materially affect the viscosity of the liquid used in the dashpot and thereby materially affect the timing of action of the relay, special means is provided for compensating for the change in viscosity. Fig. 6 indicates in a general way the change in viscosity of a liquid, such as some oils, with changes of temperature. The viscosity rapidly decreases with initial increases in temperature; and decreases much less with continued increase in temperature. The compensation for such changes should correspond with the viscosity curve of the particular liquid used.

In the drawings, as more particularly shown in Fig. 4, an opening 43 is made in the plate or piston 19 which corresponds in shape with the viscosity curve of the particular liquid used, after first determining the viscosity curve of the liquid used. Means is then provided for making this opening more or less effective in accordance with the temperature of the liquid. At low temperatures the opening is fully uncovered and as the temperature increases the opening is more extensively closed with initial increases in temperature than with the higher increases in temperature, in accordance with the viscosity curve of the liquid used. For accomplishing this change of the opening, a curved bi-metallic strip 44 is mounted edgewise on the plate 19, being attached at one end to a post 45 fixed to the plate. The other end of the strip carries a plate 46 resting on the piston plate 19 and adapted to slide over the opening 43 and close it more or less. Upon increase of temperature, the strip 44 will move the plate 46 outwardly to an amount corresponding with the increase in temperature and upon decrease of temperature will withdraw the plate 46. Thus the position of the plate will correspond with the temperature of the dashpot. But owing to the fact that the shape of the opening 43 corresponds to the viscosity curve of the liquid, the opening will be closed to a greater extent upon temperature increases starting at low temperatures than upon the same temperature increases starting at higher temperatures. Thus change of the extent of the opening is made to conform in general with the change of viscosity of the liquid and automatic compensation therefor is obtained.

Fig. 7 shows a further feature of improvement wherein the relay is adapted to withstand shocks, jars and vibrations without affecting its proper function. The parts corresponding to those already described are designated by the same reference characters. In Fig. 7 the movable sealed unit of the relay is pivotally mounted and is adapted to obtain its tripping action by rotation on its pivot. Each side of the dashpot cylinder is provided with a projecting circular stud 47 which has a bearing in an apron 48 which extends downwardly from opposite sides of the plate 34. Sufficient clearance is provided in the plate 34 to permit a small tilting of the movable unit of the relay on its pivots in a counter-clockwise direction. The left-hand end 33b of the magnetic cross-piece 33 is raised somewhat in its normal position for similarly permitting a tilting of the movable unit.

The upper end of the cylinder 12 is provided with an inclined top surface 12a and the upper end of the plunger 24 is similarly provided with an inclined upper end 24b. The lower end of the core 10b has a correspondingly inclined surface 10c. Its inner end is recessed and retains a movable ball 49. The pin 26 rests on the top of the ball.

In operation the action is similar to that already described but in this case, instead of the movable unit being raised when the plunger 24 reaches the top of the cylinder 12, the unit is tilted counter-clockwise on its pivots; and the tripping action is caused by the upper end of the cylinder 12 engaging the ball and raising it sufficiently to actuate the pin 26 to its raised position. That is, when the plunger 24 reaches its uppermost position, the magnetic flux is so changed that the attraction between the plunger and the core 10b overcomes the magnetic force which holds the movable unit in its normal vertical position and causes the tilting action by drawing the plunger nearer to the core 10b.

The operative position of the parts cannot be disturbed by shocks or jars in any direction and for securing the best results the centers of gravity of the parts of the movable unit above and below its pivot should be equidistant from the center pivot.

Fig. 8 is the same as Fig. 7 except means have been added to compensate for change in temperature of the motor or other apparatus controlled by the relay. When such apparatus has been heated by continued use, or by repeated starting currents as in the case of a motor, it is desirable that the overload should not be permitted to continue as long as when the apparatus is at a lower temperature; and the higher its temperature, the shorter should be the response interval of the relay.

In Fig. 8 a special winding 50 of a comparatively few number of turns is shown enveloping the winding 11. The latter winding is subjected necessarily to an alternating current in this use of the invention and induces current in the winding 50 which functions as a secondary winding. An impedance device such as a resistive conductor 51 having a high positive coefficient of resistance, such as nickel, iron or some alloys, is connected in circuit with the winding 50. It is more or less enclosed by a casing 52 for the purpose of controlling the heat dissipation and having its temperature related to that of the motor, or other controlled device, to secure the desired results. At low temperatures the resistive conductor 51 will have a comparatively low resistance, resulting in a comparatively large current being induced in its circuit. This causes the magnetic pull of the winding 11 on its plunger 24 being decreased a certain amount and thus requires a maximum time interval for the relay to respond. The continued passage of the load current in the winding 11, or an increase in the load current will cause an increase in the temperature of the device 51 and an increase in its resistance. This increase of resistance reduces the current in its secondary circuit which results in the winding 11 exerting an increase in its magnetic pull upon the plunger 24 over the value it would have if there had been no increase in temperature of the device 51. The relay will respond in a shorter time interval under such conditions.

Owing to the winding 11 being connected in series with the motor 53 or other apparatus controlled by the relay, or having its current corresponding thereto, as by use of a current transformer, the current supplied to the resistive conductor 51 will correspond to that supplied to the controlled apparatus. By proportioning the size, length and compactness of the conductor 51 and the extent of its enclosure by the casing 52, its temperature changes with continuation of the load current, or increase of load, may be adjusted to cause its effect on the relay in its time of response to correspond in general with the temperature, or change in temperature of the controlled motor or other apparatus. That is, by this auxiliary means, the relay is caused to respond in a shorter time interval when the controlled device is at a high temperature than would be the case when at a low temperature; and by proper proportioning of the factors above mentioned and of the turns of the windings 11 and 50, the time interval of response of the relay may be affected to a degree corresponding in general with the temperature of the controlled device. In some cases the resistive conductor may be located in juxtaposition to the controlled device, or placed within its casing, for the purpose of having its temperature correspond to that of the controlled device and the parts proportioned to give the desired results. In many cases this is not convenient or practical and the modification of action of the relay for temperature changes of the controlled device may be obtained when the resistive conductor 51 is at a distance from the load.

Fig. 9 shows a different improved form of relay from that of Figs. 7 and 8 which is adapted to withstand shocks, jars and vibrations without affecting its proper function. The parts corresponding to those already described are designated by the same reference characters. In general the relay embodies the same features as those already described with reference to Figs. 1 to 4 and also includes the secondary winding for compensation of change of temperature of the motor or other load in the controlled supply circuit. However the special means for counteracting the effects of shocks and jars without affecting the proper function of the relay is quite different from that disclosed in Figs. 7 and 8. In Fig. 9 the cylinder 12 is provided with external threads 12b at its lower end engaged by a nut 54. A leaf spring 55 extends on opposite sides of the cylinder 12 and loosely surrounds it under the nut 54. The outer ends of the leaf spring engage the top of the outer ends of the magnetic cross-plate 33 which plate, as already described with reference to Figs. 1 to 3, normally rests on the inwardly turned ends 10a of the magnet frame. Instead of this plate being fixed to the upper plate 13 of the dashpot, as in Figs. 1 to 3, the plate 13 is provided with a pair of upwardly extending pins 13a which pass freely through a pair of openings in the cross-plate 33. It is apparent that the movable unit of the relay, including the dashpot, is supported by the spring 55 which in turn engages the plate 33 which normally rests on the ends 10a of the magnet frame.

In normal operation the parts function in the manner already described with reference to Figs. 1 to 4, the operation of the parts in that respect being unaffected by the introduction of the yieldable spring support. With reference to withstanding shocks and jars or vibrations without affecting the responsive action of the relay, any force which would tend to displace the movable unit of the relay from its normal position must be transmitted to the movable unit through the cross-plate 33 because the latter forms the sole support of the movable unit. Therefore any shock or vibration which would disturb the movable unit is first transmitted to the cross-plate 33. Any movement of the cross-plate 33 from its normal position is yieldably opposed by the spring 55 instead of being directly transmitted to the movable unit of the relay. The cushioning action of the spring 55 takes up the movement of the plate 33 and opposes its movement without transmitting it to the movable unit owing to the inertia of the movable unit. Consequently any shocks or jars will not materially affect the position of the movable unit of the relay but will merely disturb momentarily the position of the plate 33. It results that as to any vertical upward direction of impacts or shocks to the relay, the spring suspension of the movable unit will counteract and nullify their affect on the parts, the shocks being taken up by the cross-plate and absorbed or cushioned by the spring. In case of extreme shocks, the movement of the cross-plate 33 might be so extreme and the inertia of the plate so great as to affect the movement of the dashpot unit; and in order to prevent this there are provided inwardly projecting stops 35a projecting from the sides of the magnet frame above the ends of the plate 33. Under extreme shocks the ends of the plate 33 would engage the stops 35a and prevent an undue force from being exerted upon the spring 55 such as might materially affect the position of the movable unit; and the plate 33 will return to its normal position after the passage of the shock without its affecting the responsive action of the relay. The stops 35a should be non-magnetic and may conveniently be formed by inwardly bending the lower ends of the non-magnetic cross-piece 35. The distance between the top of the plate 33 and the lower faces of the stops 35a must, of course, be equal to or exceed the amount of travel of the movable unit of the relay in its responsive action so as to permit the plate 33 to be raised sufficiently when the actuation of the movable unit takes place upon the occurrence of an abnormal circuit condition.

Although various embodiments of different features of my invention have been particularly disclosed, it will be understood that modifications may be made without departing from the scope thereof. It will be understood that this invention is applicable to the control of any circuit in any desired manner or to actuate any device for any purpose in the responsive action of the relay, such as for the control of a circuit breaker in the circuit to be affected. There are many applications of this invention for control purposes, according to the result desired to be accomplished.

I claim:

1. A relay comprising a magnet having a winding, a movable sealed unit extending within said winding and normally having a predetermined position in relation to said winding, a magnetic plunger movable within said unit from its normal position to its fully attracted position, an auxiliary magnetic element for forming a by-path for a portion of the flux of said magnet to said plunger when the latter is in its normal position, said unit and said element being actuated from their normal positions by the plunger upon the plunger attaining a position near its fully attracted position and then moving said element from its normal position to a position to increase the reluctance of said by-path.

2. A relay comprising a magnet having a winding, a movable sealed unit having a portion extending within said winding and a dashpot outside said winding, said unit normally having a predetermined position in relation to said winding, a magnetic plunger movable from its normal position to its attracted position within the portion of the unit extending within the winding and connected to the piston of the dashpot, and a magnetic element for forming a by-path for a portion of the flux of said magnet to said plunger when the plunger is in its normal position, said unit and said element being actuated from their normal positions upon the plunger attaining a position near its fully attracted position and then moving said element to a position to incrase the reluctance of said by-path.

3. A relay comprising a magnet having a winding, the magnetic frame of said magnet being of an inverted U-shaped form, a sealed unit extending within the winding of said magnet and normally having a predetermined position with reference to said winding, a magnetic plunger movable within said unit from its normal position to its fully attracted position, an auxiliary magnetic element forming a by-path for a portion of the flux to said plunger and from the ends of the frame of said magnet when the plunger is in its normal position, and said plunger actuating said unit and said element from their normal positions upon the plunger attaining a position near its fully attracted position and then moving said element to a position to increase the reluctance of said by-path.

4. A relay comprising a magnet having a winding and a frame, a sealed unit having a portion extending within the winding and a portion forming a dashpot external to the winding, said unit normally having a predetermined position in relation to said winding, means for pivotally supporting said unit at an intermediate point, a magnetic plunger movable from its normal position to its fully attracted position within the portion of the unit extending within the winding and connected to the piston of the dashpot, said plunger turning said unit on its pivot from its normal position by magnetic attraction of the plunger toward a portion of the frame of the magnet upon the plunger attaining a position near its fully attracted position, and means actuated by the unit when turned on its pivot.

5. A relay comprising a magnet having a winding, a magnetic plunger movable within said winding from its normal position to its fully attracted position, an auxiliary magnetic element for normally forming a by-path for a portion of the flux of said magnet to said plunger when the latter is in its normal position, said plunger being separately movable with reference to said element and means mechanically related to said element located to be engaged by said plunger when the latter closely approaches its fully attracted position for moving said element to a position to increase the reluctance of said by-path upon the plunger approaching still closer to its fully attracted position.

HAROUTIUM K. KOUYOUMJIAN.